United States Patent [19]

Mayo et al.

[11] Patent Number: 5,652,861
[45] Date of Patent: Jul. 29, 1997

[54] SYSTEM FOR INTERLEAVING MEMORY MODULES AND BANKS

[75] Inventors: David T. Mayo, Acton; David W. Hartwell, Boxboro; Hansel A. Collins, Clinton, all of Mass.

[73] Assignee: Digital Equipment Corporation, Maynard, Mass.

[21] Appl. No.: 687,692

[22] Filed: Jul. 26, 1996

Related U.S. Application Data

[63] Continuation of Ser. No. 23,033, Feb. 24, 1993, abandoned.
[51] Int. Cl.$^6$ ................................................. G06F 12/06
[52] U.S. Cl. ................................. 395/484; 395/405
[58] Field of Search ........................ 395/405, 477, 395/484, 497.01, 497.02, 497.03, 497.04, 454

[56] References Cited

U.S. PATENT DOCUMENTS

| | | | |
|---|---|---|---|
| 4,254,463 | 3/1981 | Busby et al. | 395/405 |
| 4,740,911 | 4/1988 | Shar et al. | 395/484 |
| 5,341,486 | 8/1994 | Castle | 395/405 |
| 5,412,788 | 5/1995 | Collins et al. | 395/484 |

FOREIGN PATENT DOCUMENTS

| | | | |
|---|---|---|---|
| 380855 | 8/1990 | European Pat. Off. | G06F 12/02 |
| 2256293 | 12/1992 | United Kingdom | G06F 12/06 |

*Primary Examiner*—Eddie P. Chan
*Assistant Examiner*—Kevin L. Ellis
*Attorney, Agent, or Firm*—Cesari and McKenna, LLP

[57] ABSTRACT

A memory system for a digital computer has first and second memory modules having differing numbers of independently-accessible banks and unlike capacities. The digital computer also has an addressing arrangement that employs horizontal stacking for interleaving together the banks of both the first and second memory modules, such that the first memory module is interleaved to a first level and the second memory module to a second, different level. The invention also embraces a method of interleaving the memory system employing horizontal stacking. In usual applications, horizontal stacking permits the memory system to be interleaved to a higher level than that achieved by conventional vertical stacking schemes.

7 Claims, 8 Drawing Sheets

SYSTEM FOR INTERLEAVING MEMORY MODULES AND BANKS

This is a continuation of application Ser. No. 08/023,033 filed Feb. 24, 1993, now abandoned.

BACKGROUND OF THE INVENTION

This invention relates to digital computers, and more particularly to interleaving of memory systems in digital computers.

Conventionally, "interleaving" is the process of assigning logical addresses to a plurality of memory units making up a memory system such that sequential logical addresses correspond to physical addresses of memory locations in different units. A memory location is the smallest independently accessible portion of the memory system, and can store, e.g., an eight-bit byte of data.

Interleaving is usually expressed in terms of the number of units interleaved together. For example, a system described as having four-way or four-level interleaving (i.e., as having an interleaving factor of four) can be thought of as being divided into four units whose addresses are interleaved together. The four units may be assigned addresses as follows: the locations of the first unit may be assigned addresses 0, 4, 8, 12, etc., the locations of the second unit may be assigned addresses 1, 5, 9, 13, and so forth.

Preferably, each of a plurality of the memory units are accessible independently of the other memory units. Accordingly, for accessing data located at a series of sequential addresses, interleaving permits the memory system to operate in an "overlapping" fashion, i.e., fetching data from different ones of the independently-accessible memory units at approximately the same time. This permits the interleaved memory system to provide the data faster than a non-interleaved memory system.

Generally speaking, the greater the number of level of interleaving, the faster the data can be provided. Thus, four-way interleaving can provide data roughly twice as fast as two-way interleaving. Accordingly, it is generally desirable to maximize the number of levels of memory interleaving.

The time required for data to be supplied from a memory system is generally referred to as "latency". Maximizing the number of levels of memory interleaving can reduce overall latency, i.e., memory access time. Viewed another way, maximizing the number of levels of memory interleaving, or reducing latency, results in increased data throughput in the system.

Moreover, by providing a maximum number of levels of interleaving of independently accessible memory units, memory "conflicts" can be minimized as well. Conflicts arise when the same memory unit is being accessed in separate, overlapping memory operations (e.g., read and/or write operations). Generally, the overlapping operations must be queued, and serviced one at a time by the unit. Accordingly, memory conflicts tend to reduce system throughput. Minimizing memory conflicts avoids this undesirable result.

Heretofore, known interleaving methods have placed significant constraints on the physical structure of the memory units that can be interleaved together, and this, in turn, tends to limit the interleaving factors that can be employed in interleaving memory systems.

To understand the nature of the constraints, consider a known memory system, which includes a number of memory modules of the same or different capacities (i.e., sizes). Each memory module has the same number of independently-accessible banks. Essentially, each memory module includes a data path connected, for example, to the main bus of a computer for communication with, e.g., one or more central processing units.

Such a memory system can be interleaved using a known type of interleaving that employs what we can call "vertical stacking." Vertical stacking may best be understood by considering the following example: a memory system includes a module containing 128 megabytes, and two modules containing 64 megabytes each. The memory system can be configured using vertical stacking, which permits the system to be two-way interleaved.

Specifically, the two 64-megabyte modules can be "stacked vertically" for purposes of addressing, so as to form a structure equal in capacity to the 128-megabyte unit. Then, addresses can be assigned, e.g., with addresses 0, 2, 4, . . . 254 assigned to the 128-megabyte module, addresses 1, 3, . . . 127 assigned to the "bottom" one of the stacked 64-megabyte memories, and addresses 129, 131, . . . 255 assigned to the "top" one of the stacked 64-megabyte modules. In other words, the addresses alternate between the larger module and the smaller modules. This same addressing scheme would be used even if the larger module had two banks of 64 megabytes. Where the larger module does have two banks, the addresses assigned to that larger module may be alternated between the two banks.

Consequently, vertical stacking treats each module as an integral unit for interleaving with other modules of the system, without regard to the existance of independently-accessable banks within the modules.

It would be desirable to interleave the modules of a memory system to a higher level of interleaving than has heretofore been achieved with conventional vertical stacking, thereby reducing latency and conflicts within the system.

Definitions of Certain Key Terms

As used herein, the following terms have the meanings noted below:

1. "Module"—a memory device connected via a data path to a common system bus and having one or more (e.g., two, four or another number, preferably equal to two raised to a power) banks that can be independently accessed and are under the control of a module controller. Preferably, the banks of a module have the same size.

2. "Memory configuring"—programming and operating memory modules to respond to a range of logical addresses. Due to interleaving, individual modules are not required to and preferably do not respond to contiguous (i.e., sequential) addresses.

3. "Interleave set"—a collection of memory modules configured to respond to a contiguous block of logical addresses.

4. "Positions"—an "N"-way interleave set has "N" positions that can be occupied by elements (defined below) of the set, with each position responding to a number of logical addresses equal to 1/N of the total range of addresses in the set. "N" is an integer equal to two raised to a pre-determined exponent, that is, simply stated, "N" equals a "power" of two.

5. "Elements"—a bank or collection of banks or modules equal in size to a bank in the largest memory module residing at a position (defined above) in the interleave set. Multiple elements can occupy a single position.

6. "Interleave Structure"—the combination of elements filling an interleave position.

7. "Position interleaving"—interleaving within a structure of the interleave set.

8. "Set interleaving"—interleaving within an interleave set. Set interleaving has an interleave factor which is equal to the lowest interleave factor of any of the elements within the set.

9. "Module interleaving"—interleaving within a module. A module can be module interleaved at a different number of levels than that of the structure or set containing the module.

10. "Interleave Factor"—the number of levels of interleaving of a module, structure, or interleave set.

11. "Data word"—the data occupying a memory location, i.e., the smallest block of data that can be independently accessed within a memory system.

SUMMARY OF THE INVENTION

A first aspect of the invention resides in memory configuring using what can be termed "horizontal stacking" of the modules comprising the memory system. Horizontal stacking is an interleaving scheme in which independently-accessible banks of memory modules of unlike configurations and unlike capacities can be interleaved together in a single interleave set that has a higher interleave factor than is obtainable for the memory system using just vertical stacking. Accordingly, in a sense, while the granularity of vertical stacking is individual modules, the granularity of horizontal stacking is individual banks.

In horizontal stacking, groups of modules having lesser capacities and fewer banks form structures of the interleave set, which each have the same total capacity as the largest single element of the set. Then, the largest single element and the other structures of the interleave set are assigned logical addresses so as to maximize the interleave factor of the entire set, and, preferably, so as to maximize the interleave factor of each structure and of each module thereof.

In a typical application of the invention, horizontal stacking results in the memory system having, e.g., first and second sets of memory modules that are interleaved together, and yet are themselves internally interleaved at different interleaving levels. Certain individual modules can be interleaved at a significantly higher number of levels of interleaving than others, and the interleave set will be set interleaved at a level equal to that of the highest level of module interleaving in the interleave set.

Another aspect of the invention resides in a method of interleaving a memory system whereby such a novel interleaving arrangement can be achieved. The interleaving method identifies the modules of the memory system that are to form a single interleave set. Then, the method determines the size ("LBS") of the bank of the module of the interleave set having the largest size. The method then calculates a value, i.e., an interleave number ("N") for the interleave set, which is equal to the total size of the modules divided by the LBS, and the number of positions ("P") that the interleave set is to contain, which is equal to N. Next, the method identifies the bank or banks that are to fill each of the positions such that each has a total size equal to the LBS. With that completed, the method assigns logical addresses to the memory locations of each bank of the interleave set.

The interleaving method identifies the modules of the memory system that are to form a single interleave set, as described above, by (i) determining the total size ("$C_T$") of the modules of the memory system, (ii) determining the size ("S") of the module of the memory system having the largest size, (iii) determining a value ("D") equal to $C_T$ divided by S, (iv) rounding down D to the nearest integer that is a power of two, thereby producing a value ("IF"), (v) multiplying IF by S to yield a value CS, and (vi) identifying the largest modules of the memory system that have a total size equal to the value $C_S$.

Accordingly, the invention maximizes the number of levels of interleaving in the memory system, thereby reducing latency and reducing memory conflicts.

BRIEF DESCRIPTION OF THE DRAWINGS

For a fuller understanding of the nature of the invention, reference should be had to the following detailed description taken in connection with the accompanying drawings, in which.

DESCRIPTION OF THE PREFERRED EMBODIMENT a) Illustrative Computer System

Figure 1:
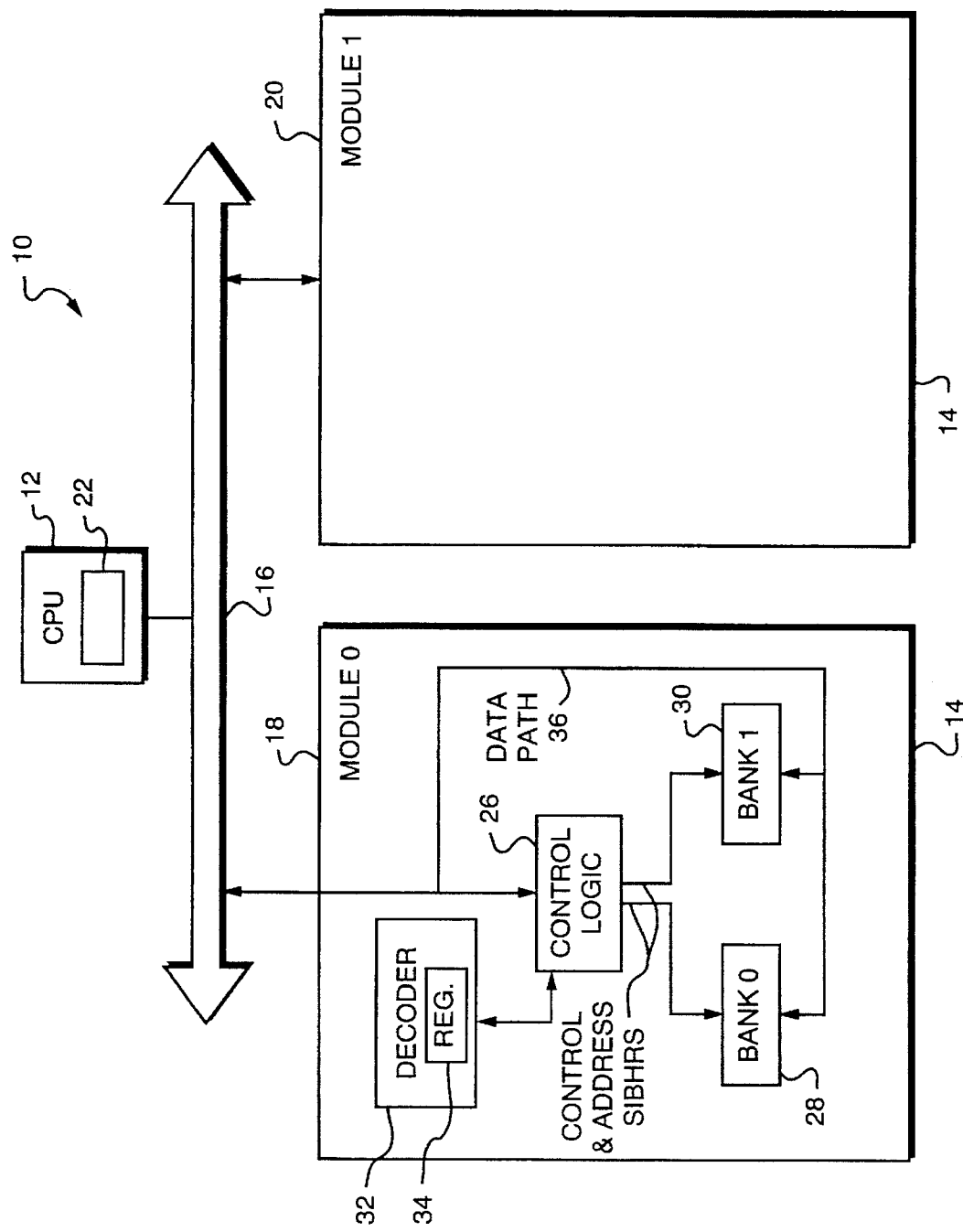
FIG. 1 is a block diagram of a computer system including a memory system of the type that can be configured in accordance with the invention.

FIG. 1 represents a computer system 10 in accordance with an illustrative implementation of the invention. The computer system 10 includes a central processing unit ("CPU") 12 and a memory system 14 interconnected by a system bus 16. The memory system 14 is shown as including two modules 18, 20, although other numbers of modules could be incorporated. The CPU 12 has a resident configuration program stored in a memory 22 for implementing a memory configuration method 100 of FIG. 2, and generating data representing the logical addresses of each module's memory locations. Since the modules 18, 20 preferably have the same construction, differing (if at all) with respect to the number of banks contained therein, only module 18 need be described in more detail.

Module 18 has control logic 26 connected to receive control, address and data transfers from the bus 16, and first and second memory banks 28, 30 under the control of the control logic 26. The address transfers include data specifying logical addresses of the memory banks 28, 30.

The module 28 also has a decoder 32 with a configuration register 34. The decoder 32 translates logical addresses contained in transfers over the bus 16 into physical addresses of memory locations in the modules 18, 20. For that purpose, the configuration register 34 stores logical address data generated by the configuration program upon start-up of the computer system 10, which data can be used by the control logic 26 to relate the logical addresses contained in bus transfers to physical addresses of the memory locations.

A further description of the construction and operation of a suitable decoder and configuration register can be had with reference to co-pending, commonly-assigned patent application Ser. No. 07/870,448, filed by Hansel Collins, et al. on Apr. 16, 1992, and entitled "Memory Bank Management and Arbitration in Multiprocessor Computer System." The disclosure of that patent application is incorporated herein by reference.

The control logic 26 uses the stored address data to direct particular banks 28, 30 to respond to, e.g., individual read and write operations specified by thee control signals obtained over the bus 16. The control logic 26 can include logic units (not separately shown) associated with the operation of each bank 28, 30, as well as a unit (not separately shown) associated with the operation of the module 18 as a whole.

The data to be written or being read is transferred via a data path 36 connected between the bus 16 and memory locations in the banks 28, 30.

The invention is not intended to be limited for use with the illustrated computer system 10.

b) Memory Configuration

Figure 2:
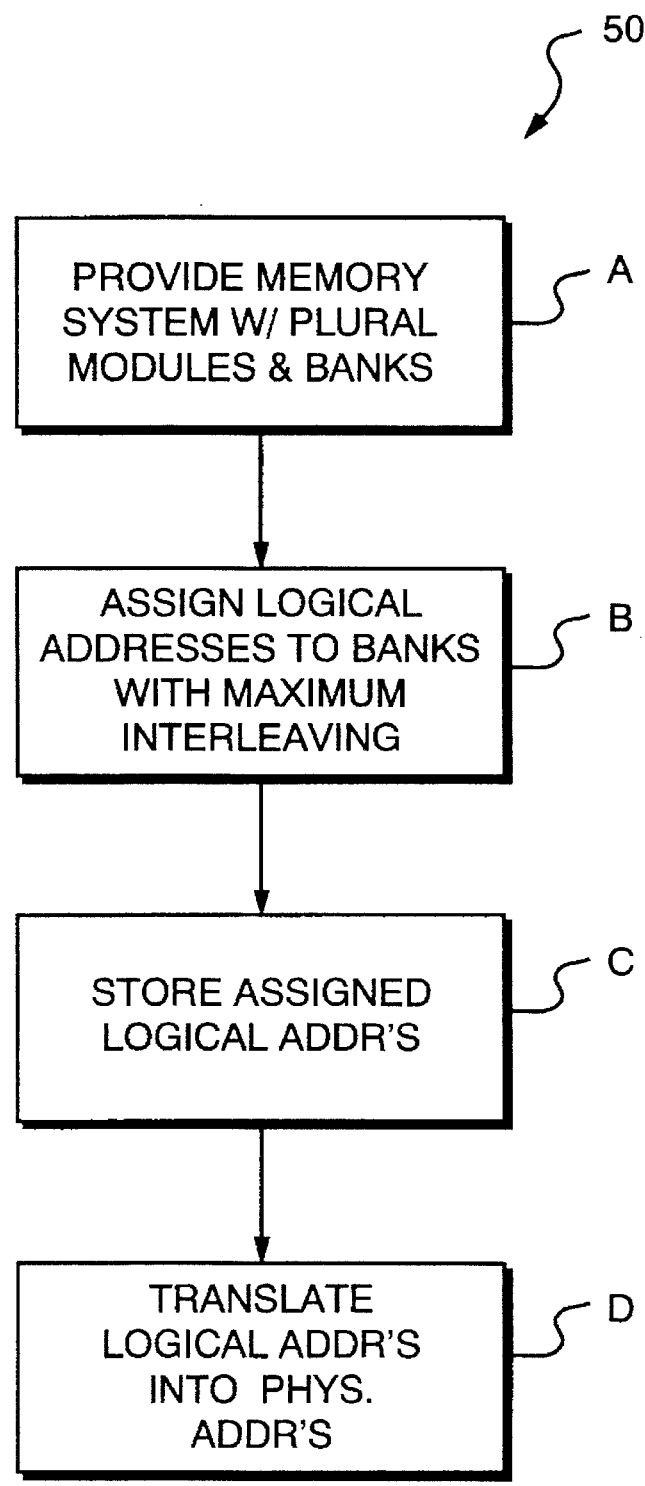
FIG. 2 is a block diagram of a method of configuring a memory system, such as that shown in FIG. 1.

FIG. 2 shows a method 50 of configuring a memory system, such as, for example, memory system 14 of FIG. 1 in accordance with the invention. In step 42, a memory system is provided that includes plural memory modules of different sizes, each including at least one bank. In some applications of the invention, at least one of the modules may include a plurality of banks of the same size. The banks of each multi-bank module have associated, consecutive bank numbers (e.g., bank No. 0, No. 1, etc.), which are unique within the module.

In step B, the method 50 assigns logical addresses to the memory locations of each of the banks. This step B uses maximum set level and maximum module level interleaving, which is achieved by horizontal stacking of the modules for purposes of addressing in accordance with the method of FIG. 3 (described below).

In step C, the method 50 stores an indication of the address assignments resulting from step B, e.g., in the configuration register 34 of FIG. 1. Then, in step D, the method 50 translates the logical addresses into physical addresses of data locations within the memory banks, e.g., so as to access data words stored therein.

Figure 3:
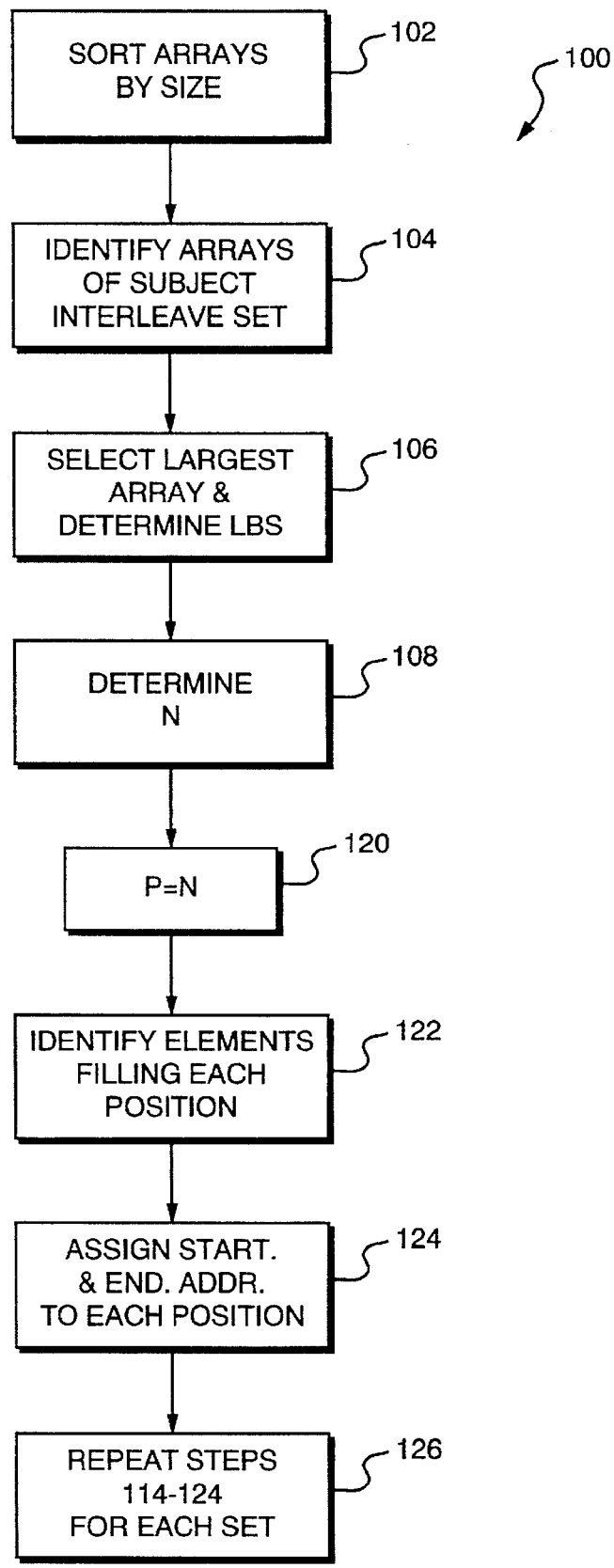
FIG. 3 is a block diagram of a preferred embodiment of step B of FIG. 2, which illustrates a method of interleaving a memory system.

Having described method 50 in general terms, we will next discuss the particular steps of memory interleaving and assigning logical addresses in accordance with the method 100 of FIG. 3.

In block 102, the memory modules are sorted by size, for example, from largest to smallest. The modules are assigned unique, consecutive module numbers, with the largest module being assigned the first number, e.g., module No. 0, the next largest assigned the next number, e.g., module No. 1, and so forth. Next, in block 104, the method 100 identifies the modules forming a single interleave set which together shall be the subject of latter operations that are described below.

Figure 4:
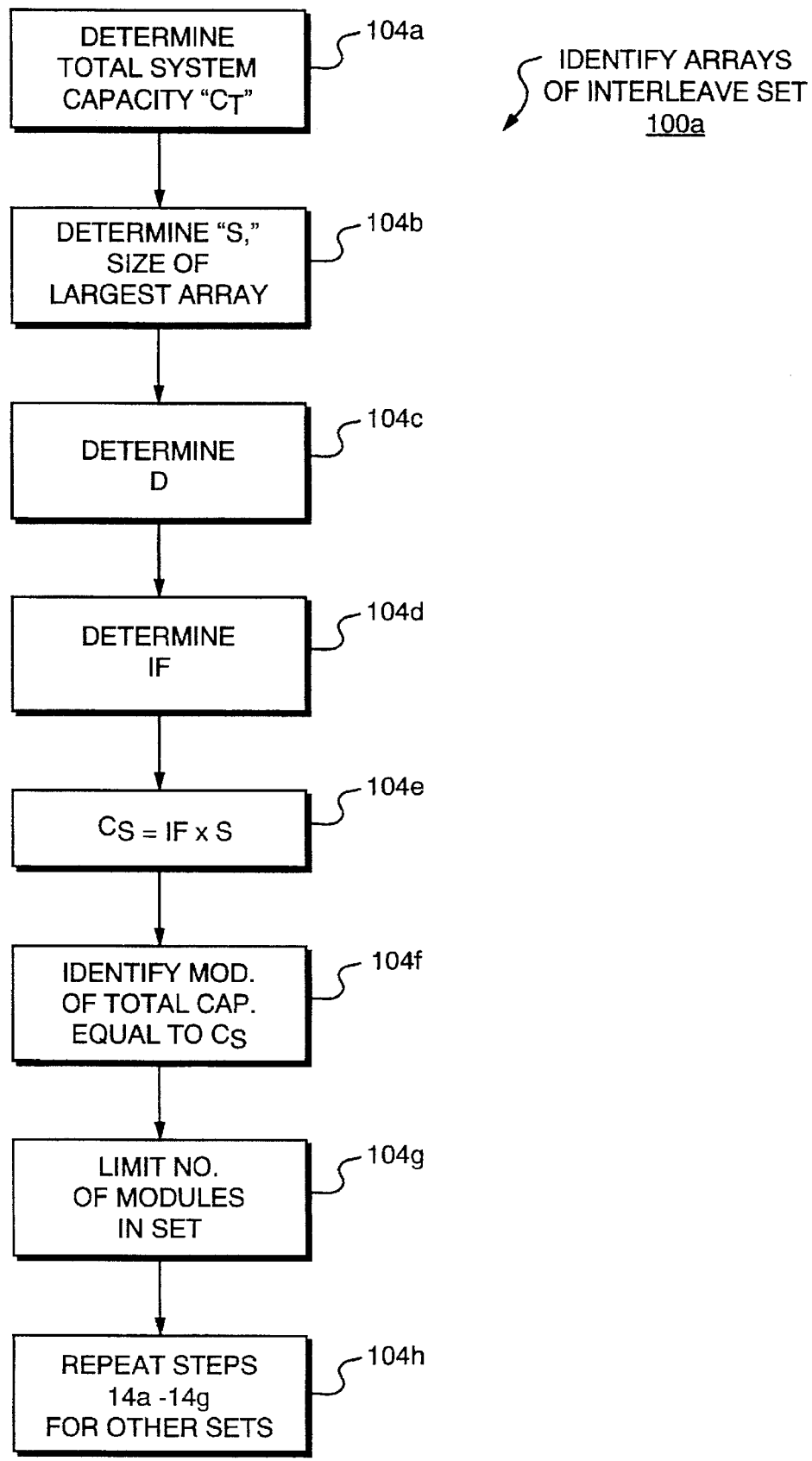
FIG. 4 is a block diagram illustrating a preferred method of performing the step of identifying the modules of each interleave set, i.e., block 114, of the method of FIG. 3.

The step of block 104 can be performed by implementing the routine 100a shown in FIG. 4. As illustrated there, in block 104a, the routine 100a first determines the total capacity CT of the memory system. Next, in block 104b, the routine 100a determines the size of the largest module, which is designated "S". In block 104c, the total memory system capacity $C_r$ is divided by the size S of the largest module to yield a value "D". In block 104d, the permitted interleave factor "IF" for the system is calculated by rounding down the value of D to the nearest integer that is a power of two. Afterwards, in block 104e, the routine 100a calculates the size of the interleave set, "$C_s$" by multiplying the permitted interleave factor IF for the system by the size S of the largest module.

In block 104f, the routine 100a actually identifies those modules, as sorted in step 102, that are part of the interleave set being identified. This is performed by assigning to that interleave set the largest of the modules not previously assigned whose total capacity is equal to the size of the interleave set $C_s$ as previously calculated in step 104e.

In some applications, and as depicted in block 104g, limits can be placed on the number (e.g., no more than four) of modules in each interleave set. Accordingly, the set of modules identified in step 104f is reduced to that number of modules set forth by the limit of block 104g. Then, in block 104h, the steps of 104a through 104g are repeated so as to identify successively each of a number of interleave sets until all of the memory modules have been assigned to one or another of the sets.

With reference again to FIG. 3, in block 106, the method 100 next selects the largest module in the subject interleave set to determine the largest bank size and to define a capacity for each interleave position in the set equal to that of the largest bank in the interleave set. We will designate the largest bank size by the initials "LBS".

In block 108, the method 100 determines the interleave factor of the set, called "N," by dividing the total capacity of the subject interleave set by the LBS. Subsequently, in block 120, the method 100 sets the number of "positions" ("P") in the interleave set to the system interleaving number N.

In block 122, the method 100 next sequentially identifies the elements filling each of the positions. Where necessary, the method 100 groups the elements together into individual positions in order to meet the LBS.

Figure 5:
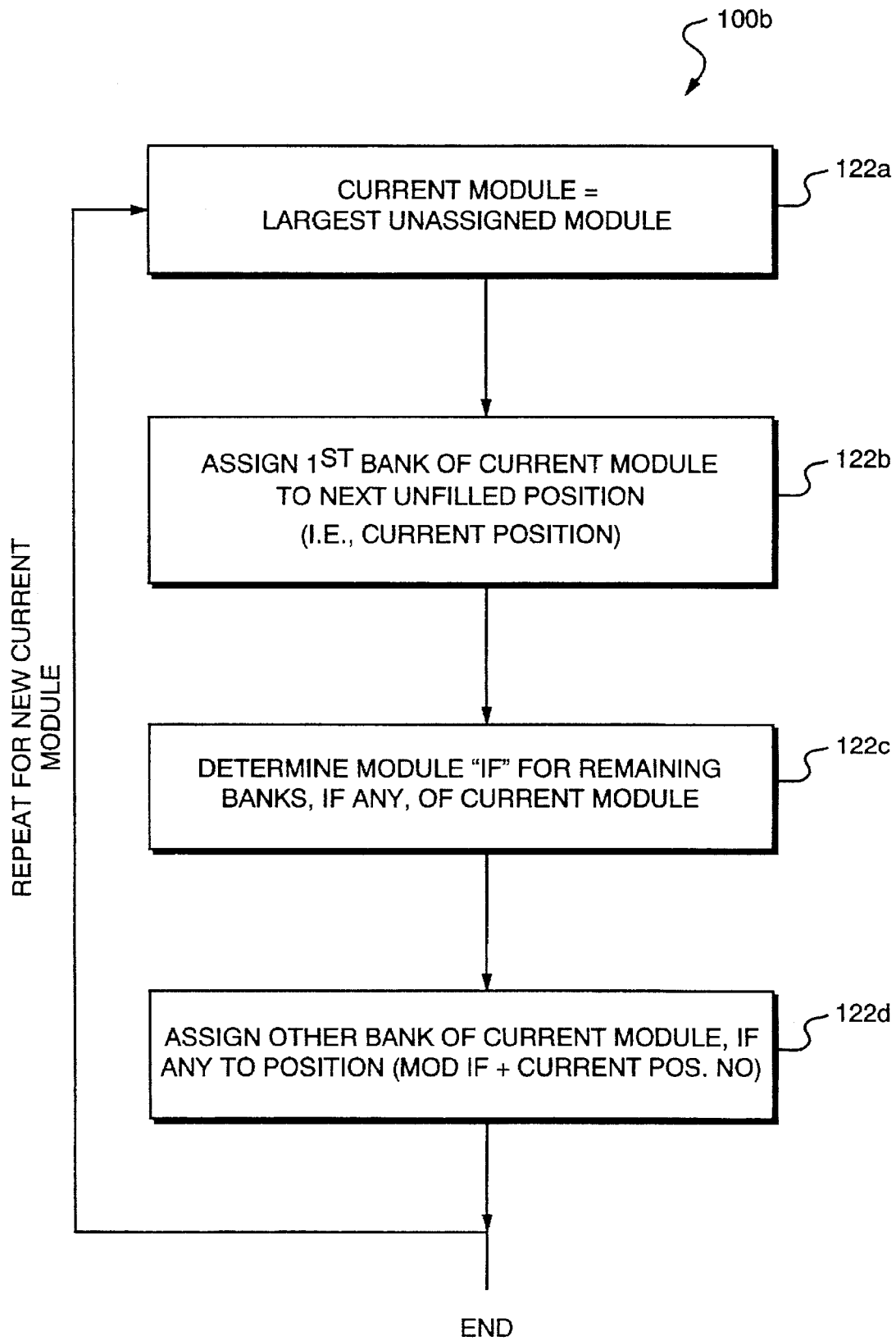
FIG. 5 is a block diagram illustrating a preferred method of performing the step of identifying the elements filling each position, i.e., block 122, of the method of FIG. 3.

FIG. 5 shows a preferred routine 100b of the method 100 for sequentially identifying elements filling each position. In block 122a, the routine 100b sets a variable called the CURRENT MODULE to identify the largest module of the interleave set that has not been assigned to a position. In block 122b, the routine 100b assigns the first bank of the CURRENT MODULE to the next untilled position (identified as the CURRENT POSITION), stacking modules as necessary to meet the LBS. Then, in block 122c, the routine 100b determines the interleave factor (IF) for the remaining banks (if any) of the CURRENT MODULE. Specifically, the Module IF equals the system IF divided by the number of banks in the module. (The system IF is equal to "N".) In block 122d, the routine 100b assigns the next bank of the current module to a position identified by the Position number "module IF plus the CURRENT POSITION". This step is repeated for any remaining banks of the CURRENT MODULE. Afterwards, the routine 100b returns to block 122a and increments the CURRENT MODULE variable to identify the next largest unassigned module. If, however, all modules of the interleave set have been assigned to the positions, routine 100b ends.

It should be noted from the foregoing description that elements having smaller sizes may have interleave factors that are different from the larger elements.

With renewed reference to FIG. 3, after all positions have been filled, the method 100 in block 124 assigns starting and ending logical addresses to each position. Essentially, logical addresses are assigned sequentially to each position in the order given by the position of the number, as determined in method 100b. Thus, address 0 is assigned to a memory location in Position 0, address 1 to a memory location in Position 1, etc., repeating this process by "dealing out" the logical addresses in a round robin fashion until all memory locations have been assigned addresses.

A special rule applies to multiple-element positions, however, in order to maximize the interleaving factor. In a multiple-element position, logical addresses assigned to the position are allocated so that consecutive logical addresses are assigned to different ones of the elements in the order specified by the bank number of the banks making up the element or elements in the case of a position filled by one or more multi-bank modules, or in the order specified by the module number of the modules making up the element or elements in the case of a position filled by a plurality of modules, or both.

Accordingly, where a position has, e.g., two elements, the logical addresses assigned to the position are assigned in alternation to the two elements, i.e., the first goes to one, the second to the other, the third to the first again, and so forth.

The addressing scheme in accordance with the invention produces a position interleaving for each multiple-element position at an interleave factor of "N" times the number of elements in the multiple-element position. The resulting interleaving factor for multiple-element positions is higher than the interleaving factor for set interleaving, and can be thought of as local interleaving within a position that maximizes the position interleaving factor by taking into account the configuration of memory elements filling the position. It is a particularly advantageous attribute of horizontal stacking of multiple-element positions. Accordingly, it can be appreciated that where the first interleave position starts at address zero, the invention provides the highest module interleave factor at the lowest address ranges. Different address schemes suitable for particular computer systems may dictate other algorithms for addressing that place the highest module interleave factor over other address ranges. For example, starting logical addresses can be changed, e.g., by reversing the above-described addressing scheme to assign lower logical addresses to interleave sets having the smallest modules.

Accordingly, the invention can provide for the interleaving of dissimilar memory configurations in order to maximize the interleave level over both the entire memory system as well as over individual memory modules. Essentially, the invention combines architecturally dissimilar modules (i.e., those containing different numbers of banks) for interleaving within a single interleave set. By doing so, the invention minimizes data latency, maximizes throughput, and minimizes memory conflicts.

c) Examples of Interleaved Memory Systems

The following examples will help clarify and illuminate the various aspects of the invention.

Figure 6:
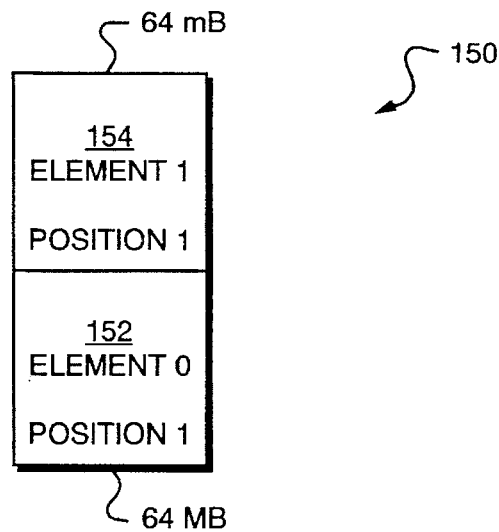
FIGS. 6–11 depict alternative memory systems illustrative of the method of FIG. 3.

FIG. 6 shows a simple arrangement that illustrates the basic concept of configuring modules with independently-accessible banks. In that drawing, a memory system 150 comprising a single memory module having two banks 152, 154, each of, e.g., 64 megabytes of capacity. Memory system 150 can be two-way interleaved into a single interleave set without the need for stacking. The resulting interleave set will have two elements and two positions corresponding to the two memory banks making up the memory system 150.

Addressing can be straight forwardly assigned, for example, so that element 0 (bank 152) will respond to logical addresses having even values and element 1 (bank 154) will respond to logical addresses having odd values.

Figure 7:
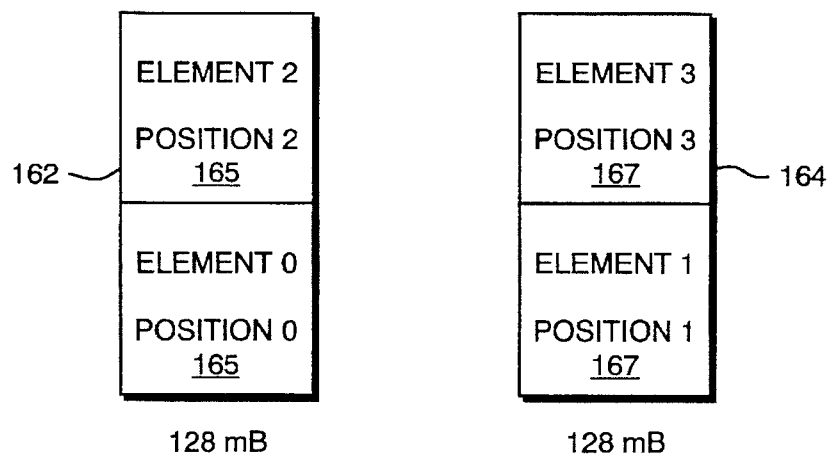

FIG. 7 illustrates the concept of module-level interleaving. It shows a memory system 160 having two memory modules 162, 164, each of 128 megabytes of capacity. Each memory module 162, 164 includes two banks 165–168. Without the use of stacking, the system 160 can be four-way set interleaved, while, at the module level, only two-way interleaving is employed. It should be noted in that drawing that each of the positions 0–3 corresponds to a single element 0–3. Addressing again can be straight forward with each module responding to every other address value.

Figure 8:
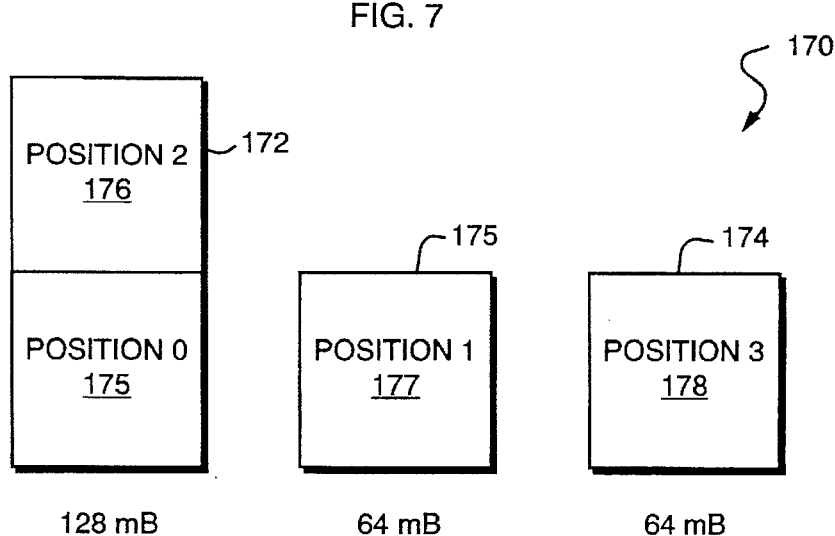

FIG. 8 illustrates horizontal stacking in accordance with the invention. It shows a memory system 170 comprising three memory modules 172–174, which have 128 megabytes, 64 megabytes and 64 megabytes respectively. The memory modules 172–174 have different numbers of banks: Memory module 172 has two memory banks 175–176, and memory modules 173 and 174 each have a single bank 177, 178. A memory system of the type shown in FIG. 8 was described in the "Background" section, hereinabove, in conjunction with vertical stacking. Vertical stacking permits that system to be two-way interleaved. The memory system can be configured in accordance with the invention in a single interleave set, which is four-way set interleaved—i.e., twice the interleave factor achievable with vertical stacking alone.

In accordance with horizontal interleaving in accordance with the invention, the memory system 170 has an LBS of 64 megabytes, and an N=P=4, with each of the four positions having a single element of 64-megabyte capacity. In this example, Position 0 corresponds to (i.e., is "filled" by) a first bank, e.g., bank 175, of the 128 megabyte module 172, Position 1 corresponds to the 64-megabyte module 173, Position 2 corresponds to the other bank 176 of module 172, and Position 3 corresponds to 64-megabyte module 174. The address range is 256 megabytes, with module 172 responding to every other address.

Figure 9:
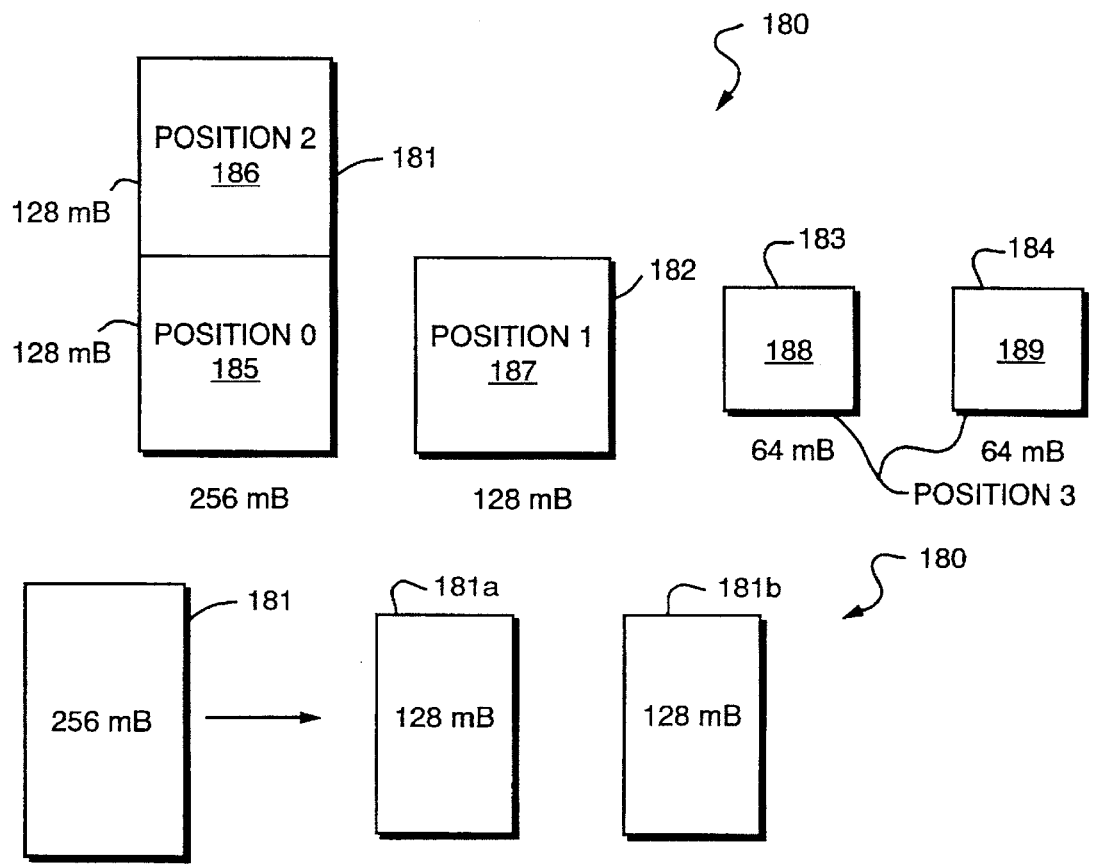

FIG. 9 shows a memory system 180 comprising four modules 181–184, which have respective capacities of 256 megabytes, 128 megabytes, 64 megabytes and another 64 megabytes. The memory modules 181–184 again have different numbers of banks: Memory module 181 has two memory banks 185–186, memory module 182 has a single memory bank 187, memory module 183 has a single memory bank 188, and memory module 184 has a single memory bank 189. For system 180, N=P=4. The memory banks 185–187 each occupy an individual one of the positions, and the memory banks 188–189 together occupy other individual ones of the positions.

Specifically, Position 0 corresponds to bank 185, Position 1 corresponds to module 182, Position 2 corresponds to bank 186, and Position 3 corresponds to the horizontally stacked modules 183 and 184. Accordingly, five separate elements occupy four positions.

The system 180 exhibits four-way set interleaving. Logical addresses can be assigned to the elements as follows: addresses 0, 4, . . . 508 to Position 0, addresses 1, 5, . . . 509 to Position 1, addresses 2, 6, . . . , 510 to Position 2, and addresses 3, 7, . . . , 511 to Position 3. Due to position interleaving of multiple-element Position 3, the modules 183, 184 respond to alternating logical addresses within that position, i.e., module 183 responds to addresses 3, 11, 19, . . . , 503, and module 184 responds to addresses 7, 15, . . . , 511. Thus, Position 3 is eight-way position interleaved.

Accordingly, each position responds to certain logical addresses (the number of which equals 1/N). The total of the logical addresses to which all the positions respond defines a range of consecutive address values. In addition, the system 180 is maximally interleaved at the set level, as well as at the module level.

Figure 10:
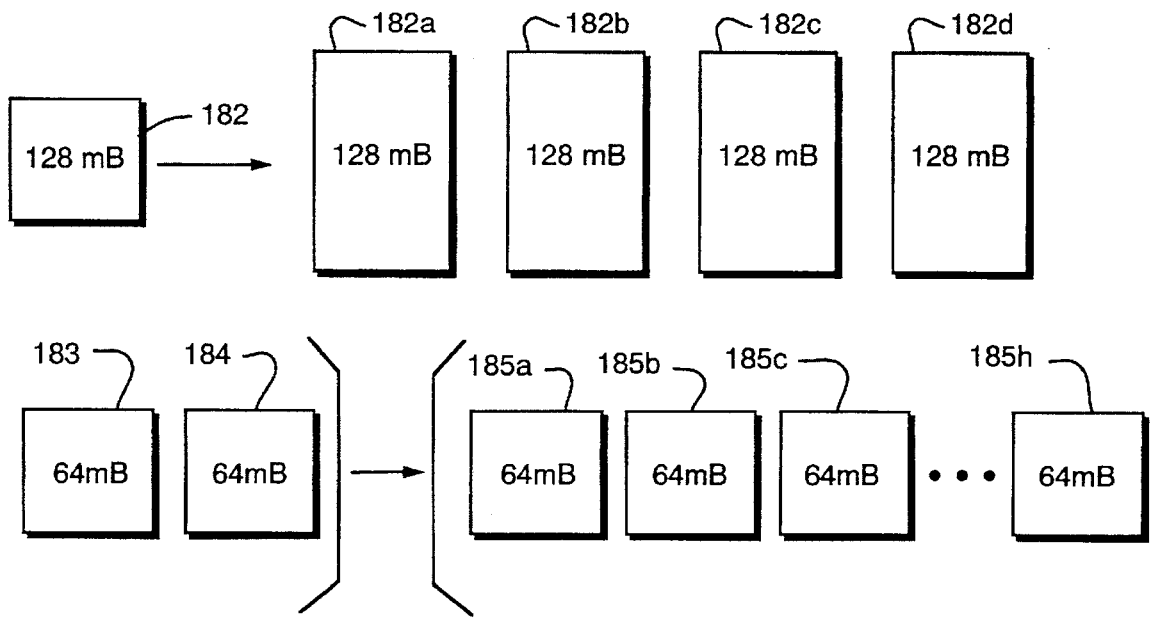

FIG. 10 illustrates module interleaving for the system 180 of FIG. 9. The module 181 is two-way module interleaved, and accordingly, to that module, the system 180 would appear to consist of two 128 megabyte elements 181a and 181b as far as interleaving and addressing are concerned. The module 182 is four-way module interleaved, and accordingly, to that module, the system 180 would appear to consist of four 128 megabyte elements 180a–180d. Similarly, the module 183 and 184 are each eight-way module interleaved, and accordingly, to each of those modules, the system 180 would appear to consist of eight elements 185a–185h of 64 megabytes each.

Figure 11:
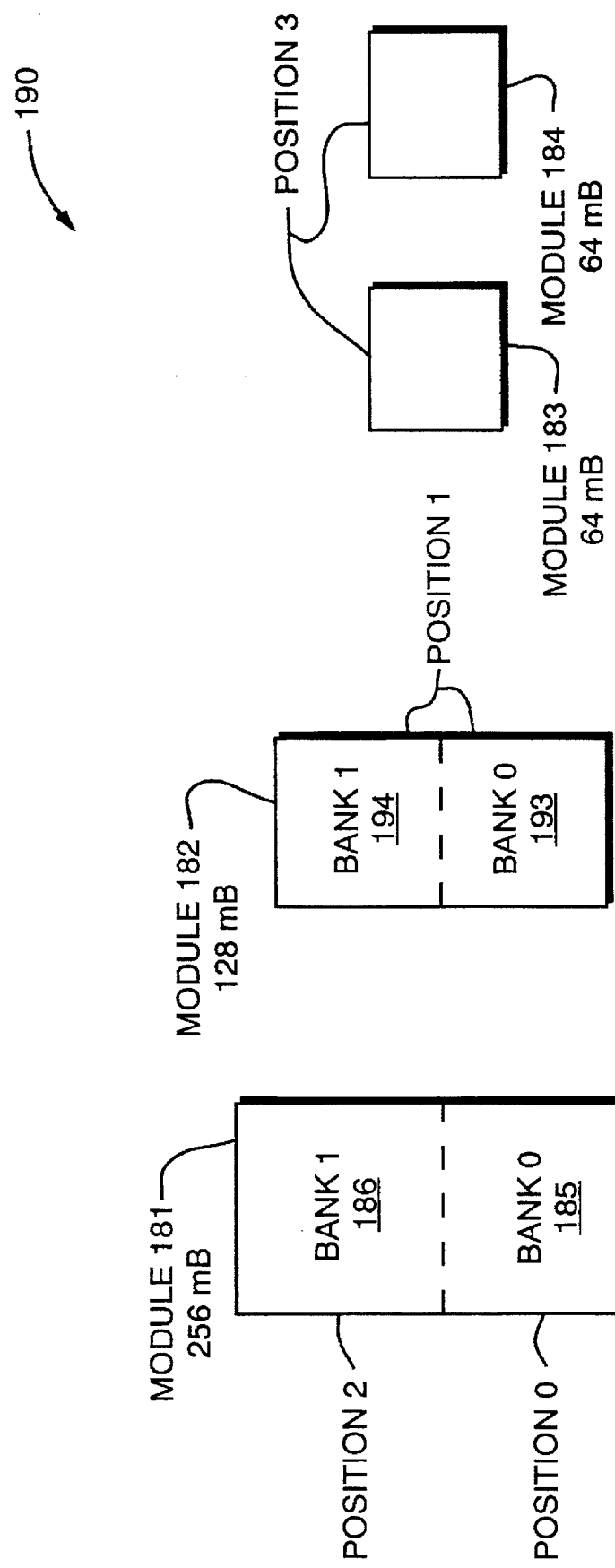

FIG. 11 shows another illustrative memory system, this one designated 190. Memory system 190 is similar to system 180, and thus like components bear the same reference numbers. Memory system 190 differs from system 180 in that the 128 megabyte module 182 is replaced by a module 192 of the same size but having two banks 193, 194. For memory system 190, N=P=4, with each position having 128 megabytes of capacity. The memory system 190 is four-way set interleaved. According to the invention, module 192 occupies Position 1, which receives addresses 1, 5, 9, 13, etc. (i.e., the position number plus the multiples of the interleave factor "N").

Moreover, module interleaving is maximized by assigning those logical addresses to the banks 193, 194 of module 182 in alternation, i.e., as follows: addresses 1, 9, etc. are assigned to bank 193, and addresses 5, 13, etc. are assigned to bank 194. Accordingly, "consecutive" addresses assigned to Position 1 are allocated to different banks so as to maximize the interleave factor for module 192. Indeed, by alternating these addresses between the banks 193, 94, an eight-way position interleaving is achieved for that module 193 even though the set is only interleaved four ways.

The foregoing description has been limited to a specific embodiment of this invention. It will be apparent, however, that variations and modifications may be made to this embodiment, with the attainment of some or all of the advantages of the invention. Therefore, it is the object of the appended claims to cover all such variations and modifications as come within the true spirit and scope of the invention.

What is claimed is:

1. A memory apparatus comprising:

A) a first memory module having a first number of independently-accessible banks;

B) a second memory module having a second number of independently-accessible banks, said second number being different from said first number; and C) addressing means coupled with said first and second memory modules for interleaving said first and second memory modules to a first level of interleaving, and for internally interleaving said banks of said first memory module to a second level of interleaving that differs from said first level of interleaving and said banks of said second memory module to a third level of interleaving that differs from said first and second levels of interleaving.

2. The memory system in accordance with claim 1, further comprising translation means coupled with said first and second memory modules and said addressing means for translating a plurality of logical addresses into a plurality of physical addresses of said memory banks of said first and second memory modules.

3. The memory system in accordance with claim 1, wherein said first number is two.

4. A memory apparatus comprising:

A) a first memory module having a plurality of independently-accessible banks;

B) a second memory module having a plurality of independently-accessible banks; and C) addressing means coupled with said first and second memory modules for interleaving said memory modules to a first level of interleaving, and internally interleaving said banks of said first memory module and internally interleaving said banks of second memory module, to interleave the first and second memory modules to one or more levels of interleaving that differ from said first level of interleaving.

5. The memory system in accordance with claim 4, further comprising translation means coupled with said first and second memory modules and said addressing means for translating a plurality of logical addresses into a plurality of physical addresses of said memory banks of said first and second memory modules.

6. A memory apparatus comprising:

A. a plurality of memory modules each having one or more independently-accessible banks, with at least one of said modules having more than one bank and certain banks having larger capacities than others;

B. addressing means coupled to said plurality of memory modules for associating together modules with smaller capacity banks and interleaving the associated modules and the larger-capacity bank modules to a first level of interleaving, and for further internally interleaving the banks within each memory module to one or more levels of interleaving that differ from the first level of interleaving.

7. The memory system in accordance with claim 6, further comprising translation means coupled with said first and second memory modules and said addressing means for translating a plurality of logical addresses into a plurality of physical addresses of said memory banks of said first and second memory modules.

* * * * *